United States Patent [19]

Tezuka et al.

[11] Patent Number: 4,573,087
[45] Date of Patent: Feb. 25, 1986

[54] RECORDING APPARATUS

[75] Inventors: Nobuo Tezuka; Tokihiko Ogura, both of Kanagawa, Japan

[73] Assignee: Canon Kabushiki Kaisha, Tokyo, Japan

[21] Appl. No.: 678,647

[22] Filed: Dec. 6, 1984

[30] Foreign Application Priority Data

Dec. 9, 1983 [JP] Japan .................................. 58-232539

[51] Int. Cl.[4] .......................... H04N 5/78; G11B 5/04; G11B 5/09
[52] U.S. Cl. ..................................... 360/60; 360/35.1; 360/75; 358/906
[58] Field of Search ................ 360/60, 105, 106, 35.1, 360/33.1, 75, 78; 358/906, 335

[56] References Cited

U.S. PATENT DOCUMENTS

| 3,492,669 | 1/1970 | Levine | 360/78 X |
|---|---|---|---|
| 4,131,919 | 12/1978 | Lloyd et al. | 360/9.1 |
| 4,198,666 | 4/1980 | Manzke et al. | 360/106 |
| 4,386,376 | 5/1983 | Takimoto et al. | 358/335 |
| 4,396,955 | 8/1983 | Kohtani et al. | 360/60 |
| 4,400,743 | 8/1983 | Takimoto et al. | 358/335 |
| 4,458,273 | 7/1984 | Johnson | 360/60 X |
| 4,481,550 | 11/1984 | Miller et al. | 358/906 X |

FOREIGN PATENT DOCUMENTS 2916387 10/1979 Fed. Rep. of Germany .

Primary Examiner—Raymond F. Cardillo, Jr.
Assistant Examiner—Alyssa H. Bowler
Attorney, Agent, or Firm—Toren, McGeady, Stanger, Goldberg & Kiel

[57] ABSTRACT

In the disclosed recording apparatus an arrangement moves a recording head relative to a record bearing medium, a detector detects when the recording head is in a substantially stabilized position, and a facility responds to the output of the detector to produce an output signal that enables the recording. This assures initiation of a recording operation when the head is in a stable condition.

17 Claims, 11 Drawing Figures

FIG. 3(a) OUTPUT OF 8
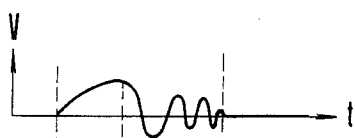
FIG. 3(b) OUTPUT OF 10
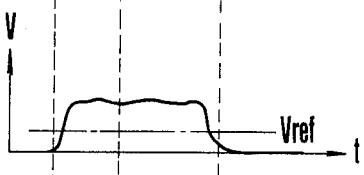
FIG. 3(c) OUTPUT OF 11
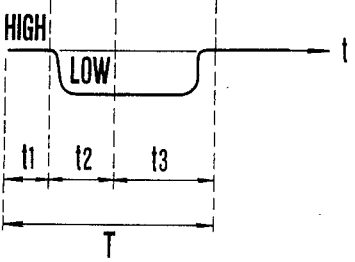

FIG.5(a) OUTPUT OF 12

FIG.5(b) OUTPUT OF 15

FIG.5(c) Q-OUTPUT OF 21

FIG.5(d) Q̄-OUTPUT OF 22

FIG.5(e) OUTPUT OF 23

RECORDING APPARATUS

BACKGROUND OF THE INVENTION

1. Field of the Invention:

This invention relates to recording apparatus in which the recording position is shifted by moving a recording head relative to the record bearing medium.

2. Description of the Prior Art:

Apparatuses that record information such as video signals on a rotary magnetic sheet shaped or disc shaped record bearing medium, form one of two types of recording tracks, concentric or spiral. In an apparatus which successively forms concentric round recording tracks, the magnetic recording head is intermittently moved radially of the record bearing medium.

When the head is moved in this intermittent manner, the head and the head carrier generally behave as shown in FIG. 1, where the abscissa is in time and the ordinate is in the distance the head moves. Taking the start of the current supply to a head-moving drive source (for example, a plunger) as the origin O, along the time axis, the time T from the start of current supply to initiation of an information signal recording operation is composed of three components. The first component is a time delay t1 from the start of the current supply to the start of motion of the driving system, the second a travel time t2 necessary for the head to travel a prescribed track pitch, and the third a time t3 from the moment at which the head has arrived at a recording position to the moment at which, as vibrations substantially end, the head reaches a substantially stable state. Therefore, from the start of current supply to the head, the initiation of a signal recording operation by the head must be deferred for the duration of of the time T.

On the other hand, when the drive source for moving the head is in the form of an electromagnetic device such as a plunger or stepping motor, its control generally employs an open loop. Then, the temperature and humidity of the atmosphere in which the recording apparatus is used, the position the recording apparatus assumes when it is held by hand, and the actual voltage of the electrical power source or battery influence the delay time t1 and the travel time t2, and hence the time T from the start of current supply to the start of recording.

In prior art recording apparatuses of this kind, timing of the recording involved presuming the maximum possible range of variation of the time T. This, however, lengthens the cycle of the head travel followed by recording with a consequent decrease in the amount of information recorded per unit of time. If the timing of the recording is determined by presuming the worst conditions, the head operating mechanism operates in the usual good conditions without making the most of its ability. Such use is inefficient.

SUMMARY OF THE INVENTION

An object of this invention is to provide a recording apparatus of the type in which the recording position is altered by moving the recording head relative to the record bearing medium, and which eliminates the above-described drawbacks, and, therefore, to provide an improved recording apparatus.

Another object of the invention is to provide a recording apparatus capable of recording with a minimum delay time depending on the operating conditions of the apparatus.

Still another object of the invention is to provide a recording apparatus which allows a head moving mechanism to bring its ability into full play so as to increase the amount of recording per unit of time.

A further object of the invention is to provide a recording apparatus capable of assuring that the recording is always carried out with the head stabilized.

According to an aspect of the present invention, a recording apparatus comprises signal recording means including a movable recording head, moving means for intermittently moving the head relative to a record bearing medium, detecting means for detecting that the head reached a predetermined substantially stable state at a moved position, and enabling means responsive to the detecting means for enabling the recording means to record a signal on the medium.

Other objects and features of the invention will become apparent from the following description of a preferred embodiment thereof taken in conjunction with the accompanying drawings.

BRIEF DESCRIPTION OF THE DRAWINGS

The present invention will next be described in connection with a preferred embodiment thereof by reference to the accompanying drawings in which:

FIGS. 3(a) to 3(c) are wave-forms illustrating a manner in which the apparatus of FIG. 2 operates.

FIGS. 5(a) to 5(e) are pulse timing charts illustrating the manner in which the circuit of FIG. 4 operates.

DETAILED DESCRIPTION OF THE PREFERRED EMBODIMENT

Figure 2:
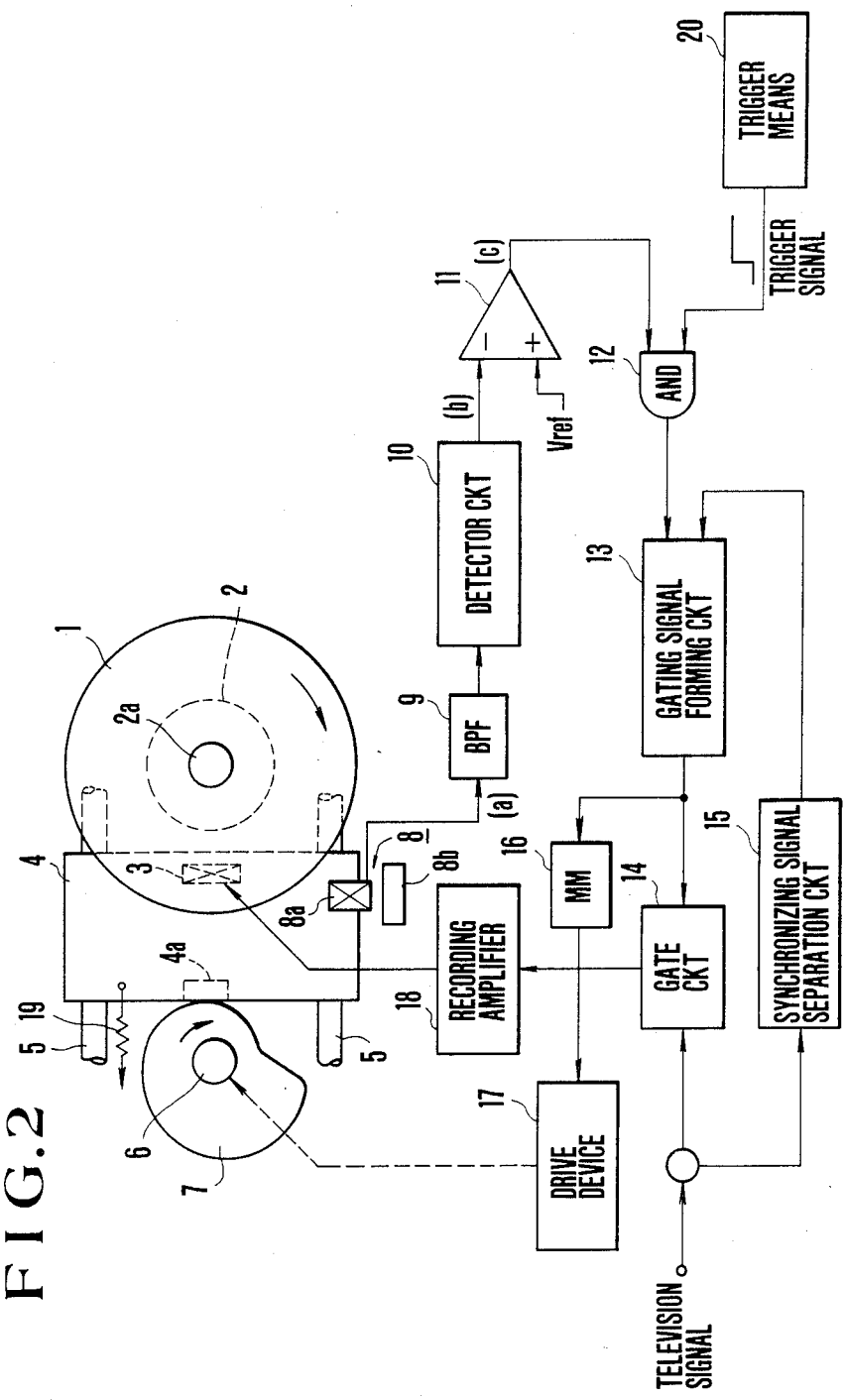
FIG. 2 is a partly block partly schematic diagram of the control system and the head moving mechanism of an embodiment of a recording apparatus according to the invention.

FIG. 2, shows an embodiment of the invention applied to a magnetic still video recording apparatus in which television or video signals for every single field are recorded in one track of a rotary type magnetic sheet as it rotates one revolution.

A magnetic sheet 1 forming a record bearing medium is driven by an output shaft 2a of an electric motor 2 so it rotates at a constant speed corresponding to the field rate of a television. A magnetic head 3 as an example of the recording head confronts the recording surface of the magnetic sheet 1 to record signals thereon. A head carrier 4 fixedly carries the magnetic head 3 and is movable along a pair of guide rails 5. A drive shaft 6 for a cam 7 is rotated stepwise by a ratchet mechanism, a step motor or other suitable drive device 17, while rotating the cam 7 intermittently through predetermined angles. The camming surface of the cam 7 is in contact with a cam follower portion 4a of the head carrier 4 so that by the cam 7, the head carrier 4, or the head 3 travels a predetermined track pitch in the radial direction of the magnetic sheet 1. A return spring 19 is connected to the head carrier 4.

A vibration sensor 8 detects the vibrating state of the head 3 and, in this instance, includes coil 8a fixedly secured to the head carrier 4 and a permanent magnet piece 8b fixedly secured to a casing (not shown) of the apparatus. The sensor may be otherwise constructed from photoelectric sensing means (for example, a photo coupler). The output of the coil 8a is applied through a band pass filter 9 and a detector circuit 10 to the inverting input of a comparator 11, whose non-inverting input is connected to the reference voltage Vref. The output of the comparator 11 is applied to one of two inputs of an AND circuit 12, the other input of which is connected to the output of a trigger means 20. Responsive to actuation of, for example, a record start switch, the trigger means 20 produces a trigger signal. When the output signal of the comparator 11 is high, the AND circuit 12 produces an output signal of high level. The output of the AND circuit 12 is connected to the input of a gating signal forming circuit 13.

Meanwhile, a television video signal modulated so as to be suited for magnetic recording (for example, frequency modulation) is applied through a gate circuit 14 and a recording amplifier 18 to the magnetic head 3, while a synchronizing signal separator circuit 15 receptive of the television video signal producing vertical synchronizing signals which are applied to the gating signal forming circuit 13. The gating signal forming circuit 13 produces an output signal of high level for a period (one vertical synchronizing period) from the falling edge of the vertical synchronizing signal which occurs just after the output of the AND circuit 12 has become high to the falling edge of the next vertical synchronizing signal. This signal opens the gate circuit 14 to allow the video signal for one field to pass therethrough to the recording amplifier 18 and therefrom to the magnetic head 3. Details of the gating signal forming circuit 13 are described with reference to FIGS. 4 and 5. The falling edge of the output of the gating signal forming circuit 13 actuates a monostable multivibrator (MM) 16. Its output operates the drive device 17 including, for example, a plunger and a ratchet mechanism or stepping motion to move the head 3 one track pitch through the cam 7.

Figure 1:
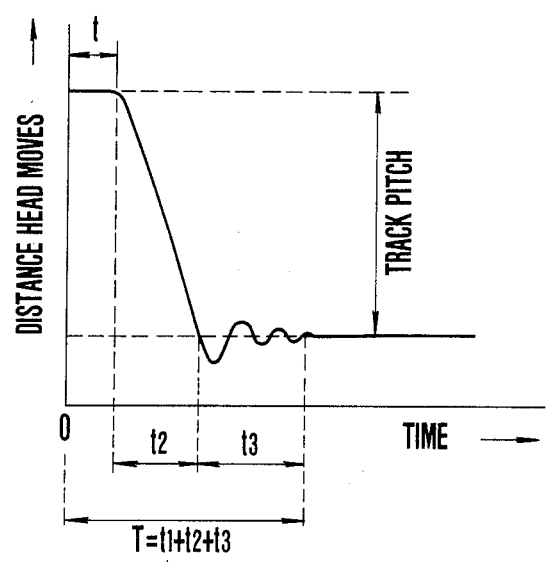
FIG. 1 is a graph illustrating variation with time of the moved position of the recording head.

With the operating mechanism for the head 3 shown in FIG. 2, as the cam 7 rotates one step, it moves the head 3 on the carrier 4 one track pitch along a path shown in FIG. 1. The vibration sensor 8 detects vibrator of the head 3, producing an output signal as shown in FIG. 3(a). This signal is changed to a signal shown in FIG. 3(b) in passing through the band pass filter 9 and the detector circuit 10. The output of the detector circuit 10 is applied to the inverting input of the comparator 11. Since the other or non-inverting input of the comparator 11 is supplied with the reference voltage Vref. representing that the amplitude of vibration of the head 3 is damped to substantially zero, or the head 3 reaches substantially a stable state, a signal component owing to vibrations of smaller amplitude than the reference voltage Vref., or noise background is removed as shown in FIG. 3(b). At the output of the comparator 11, therefore, a discrimination signal shown in FIG. 3(c) is obtained. This signal is applied to the AND circuit 12. Although the trigger signal from the trigger means 20 is applied to the AND gate 12, the output of the AND gate 12 does not change to high so long as the comparator 11 produces a low output signal. As the gating signal forming circuit 13 is not triggered, the gate circuit 14 remains closed, thereby hindering the video signal from being supplied to the recording amplifier 18. Therefore, the possibility of recording the video signal in the disturbed path of track before the head 3 is stabilized against vibrations as it travels from track to track, can be reduced. Then, when the head 3 becomes stable at the moved position, or standstill, the comparator 11 changes its output of FIG. 3(c) to high. Responsive to this, the AND gate 12 is gated on to pass the trigger signal from the trigger means 20. Thus, the determination of the timing of the initiation of the recording operation can be made in such a way as to automatically follow up the variation with the time T of FIG. 1 or the time interval from the start of current supply to the head drive device 17 to a moment at which the stable recording becomes possible. This enables the head moving mechanism to bring its ability into full play, and produces an advantage of increasing the recording amount per unit of time. Therefore, even just after the recording has been made, when a recording is to be made again, the timing for enabling the recording can be automatically set up with high accuracy and reliability. Thus high speed recording becomes possible to perform.

In the embodiment described above, the elements 3, 13–15 and 18 constitute a means for recording one field of television signals, and the elements 8-11 constitute a means for detecting when the head 3 reaches substantially a stable state. With this, the output of the comparator 11 serves as the recording enable signal.

Figure 4:
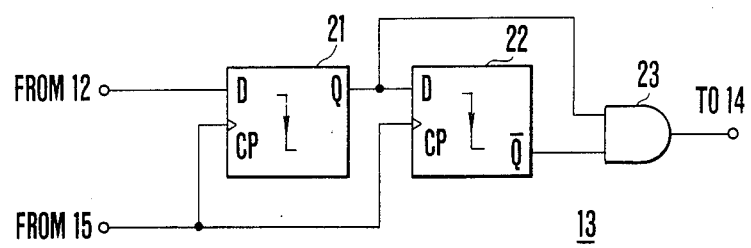
FIG. 4 is a block diagram illustrating the details of the gating signal forming circuit of FIG. 2.

FIG. 4 illustrates the details of the gating signal forming circuit 13 in the recording apparatus of FIG. 2, and FIGS. 5(a) to 5(e) are pulse timing charts illustrating the manner in which the circuit of FIG. 4 operates. The gating signal forming circuit 13 shown in FIG. 4 comprises a series connection of falling edge synchronous D-flip-flops 21 and 22, and an AND circuit 23. The D-input of the flip-flop 21 of the first stage receives the output of the AND gate 12, the D-input of the flip-flop 22 of the second stage receives the Q output of the flip-flop 21 of the first stage, and the clock inputs of both flip-flops 21 and 22 receive the vertical synchronizing signal from the synchronizing signal separation circuit 15. The Q output of the flip-flop 21 of the first stage and the $\overline{Q}$ output of the flip-flop 22 of the second stage are connected to the respective inputs of the AND gate 23.

The Q output of the flip-flop 21 as shown in FIG. 5(c) changes to high in synchronism with the falling edge of the vertical synchronizing signal (FIG. 5(b)) which is applied just after the output of high level (FIG. 5(a)) of the AND circuit 12 has been applied. The $\overline{Q}$ output of the flipflop 22 as shown in FIG. 5(d) changed to low in synchronism with the falling edge of the vertical synchronizing signal which is applied just after the Q output of high level of the flip-flop 21 has been applied. Therefore, the output of the AND circuit 23 as shown in FIG. 5(e) takes high level for a period from the falling edge of one vertical synchronizing signal to the falling edge of the next vertical synchronizing signal, that is, one-field period. This high level signal is applied to the gate circuit 14 of FIG. 2 and also actuates the mono-stable multi-vibrator 16 of FIG. 2 by the falling edge thereof.

As described in greater detail above, the invention uses means responsive to detection of the time the recording head is substantially stabilized after it has travelled to a recording position for producing an output signal that enables the head to initiate a recording operation. Thus, the vibration of the recording head is monitored, and when the head is substantially stabilized against vibrations, the initiation of the recording operation is permitted to achieve good recording regardless of the situation. Because tolerance for the worst situation used in the prior art recording apparatus, is not necessarily presumed in determining the timed relationship of the initiation of the recording operation, the time gap from the termination of travel of the recording head to the initiation of the recording operation is minimized. This offers the advantage of allowing the moving mechanism for the recording head to travel at high speed and results in efficient operation. Hence, high speed recordings become impossible to perform.

Another advantage arises when the recording apparatus takes the form of a camera. That is, recording can occur only when the camera is hand-held with enough stability so as not to introduce vibrations into the recording head. This insures pictures of an improved quality during reproduction.

Though the foregoing embodiment has been described in connection with the application of the invention to the magnetic recording apparatus, the present invention is not confined thereto. It is to be understood that the present invention is applicable to other types of recording apparatus, namely, the optical, the optico-magnetic and the electrostatic capacity types. Also, the form of the record bearing medium is not limited to the sheet, but may be other forms such as drum and tape, provided that the recording head is required to travel intermittently. (For example, the multi-track linear tape recording apparatus, etc.).

What is claimed is:

1. A recording apparatus comprising:
   (A) signal recording means including a movable recording head which is movable relative to a record bearing medium;
   (B) moving means for intermittently moving said head relative to the medium;
   (C) detecting means for detecting that said head has reached a predetermined substantially stable state at a position to which it has moved; and
   (D) enabling means responsive to said detecting means for enabling said recording means to record a signal on the medium when said head has reached said predetermined substantially stable state.

2. The apparatus according to claim 1, further comprising:
   trigger means for producing a recording trigger signal;
   said enabling means including a logic gate circuit for supplying said trigger signal to said recording means only when said head has reached said predetermined substantially stable state.

3. The apparatus according to claim 1, wherein said moving means includes:
   a movable head carrier for carrying said head;
   a cam for moving said carrier; and
   a drive member for driving said cam.

4. The apparatus according to claim 3, wherein said detecting means includes:
   a sensor for sensing the movement of said head carrier and for producing a corresponding output signal; and
   a detecting circuit for detecting, on the basis of the output signal of said sensor, that said head reached said predetermined substantially stable state.

5. The apparatus according to claim 4, wherein said sensor is of a magnetic type.

6. The apparatus according to claim 4, wherein said sensor is of a photo-electric type.

7. A recording apparatus using a rotary type record bearing medium, comprising:
   (A) recording means including a movable recording head for recording signals at different positions on the medium;
   (B) rotating means for rotating the medium relative to said recording head;
   (C) moving means for intermittently moving said recording head relative to the medium;
   (D) trigger means for triggering said recording means;
   (E) detecting means for detecting that said recording head reached a predetermined substantially stable state at each position to which it is moved; and
   (F) control means responsive to said detecting means for enabling said trigger means only when said recording head has reached said predetermined substantially stable state.

8. The apparatus according to claim 7, wherein said moving means includes:
   a movable head carrier for carrying said head;
   a cam for moving said carrier; and
   a drive member for driving said cam.

9. The apparatus according to claim 8, wherein said detecting means includes:
   a sensor for sensing the movement of said head carrier and for producing a corresponding output signal; and
   a detecting circuit for detecting, on the basis of the output signal of said sensor, that said head has reached said predetermined substantially stable state.

10. The apparatus according to claim 9, wherein said sensor is of a magnetic type.

11. The apparatus according to claim 9, wherein said sensor is of a photo-electric type.

12. A magnetic video recording apparatus using a rotary type magnetic sheet, comprising:
    (A) a magnetic recording head;
    (B) a movable head carrier for carrying said head;
    (C) a moving mechanism for intermittently moving said head carrier so that the recording position of said head on the sheet is changed;
    (D) a rotation drive member for rotating the sheet relative to said head;
    (E) a recording circuit for supplying a predetermined amount of a video signal to said head;
    (F) detecting means for detecting that said head carrier has reached a predetermined substantially stable state; and
    (G) control means responsive to said detecting means for enabling said recording circuit only when said head carrier has reached said predetermined substantially stable state.

13. The apparatus according to claim 12, further comprising:
    a trigger circuit for triggering said recording circuit;
    said control means being arranged to enable said trigger circuit only when said head carrier has reached said predetermined stable state.

14. The apparatus according to claim 12, wherein said detecting means includes:
    a sensor for sensing the movement of said head carrier and for producing a corresponding output signal; and
    a detecting circuit for detecting on the basis of the output signal of said sensor that said head has reached said predetermined substantially stable state.

15. The apparatus according to claim 14, wherein said sensor is of a magnetic type.

16. The apparatus according to claim 14, wherein said sensor is of a photo-electric type.

17. The apparatus according to claim 12, wherein said moving mechanism includes a cam for moving said head carrier and a driving member for intermittently drive the cam.

* * * * *